(12) United States Patent
Batta et al.

(10) Patent No.: US 9,836,746 B2
(45) Date of Patent: *Dec. 5, 2017

(54) DETECTION OF AN UNAUTHORIZED WIRELESS COMMUNICATION DEVICE

(71) Applicant: SYMBOL TECHNOLOGIES, LLC, Lincolnshire, IL (US)

(72) Inventors: Puneet Batta, San Jose, CA (US); Trevor Miranda, San Jose, CA (US); Jacob Thomas, Santa Clara, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,451

(22) Filed: Nov. 9, 2016

(65) Prior Publication Data

US 2017/0061439 A1 Mar. 2, 2017

Related U.S. Application Data

(63) Continuation of application No. 14/224,110, filed on Mar. 25, 2014, now Pat. No. 9,525,689.

(51) Int. Cl.
*G06Q 20/40* (2012.01)
*H04L 29/06* (2006.01)
(Continued)

(52) U.S. Cl.
CPC ..... *G06Q 20/4016* (2013.01); *G06Q 20/3226* (2013.01); *H04K 3/822* (2013.01);
(Continued)

(58) Field of Classification Search
CPC ............ G06Q 20/4016; G06Q 20/3226; H04L 63/1416; H04L 63/1408; H04L 63/1475;
(Continued)

(56) References Cited

U.S. PATENT DOCUMENTS 6,448,906 B1 9/2002 Nachtsheim et al.
7,715,800 B2 5/2010 Sinha
(Continued)

FOREIGN PATENT DOCUMENTS

WO 2013126747 A2 8/2013

OTHER PUBLICATIONS

Zhao et al., "Card User Awareness Based on Linear Sub-Space Representation", 2011, IEEE, pp. 227-232.*
(Continued)

*Primary Examiner* — Matthew Smithers

(57) ABSTRACT

A technique for the detection of an unauthorized wireless communication device includes monitoring of Bluetooth® communications activity by a Bluetooth® capable communication device. Any monitored communication activity is analyzed against parameters that are predefined to detect suspected illegal activity. If illegal activity is suspected by the analysis, an alert is generated for a system administrator. The predefined parameters associate illegal activity with; data that includes credit card numbers and expiration dates, credit card transaction logging information, non-discoverable devices, activity after store hours, exceedingly long activity, etc.

17 Claims, 2 Drawing Sheets

(51) Int. Cl.
  *H04W 12/02* (2009.01)
  *H04W 12/12* (2009.01)
  *H04K 3/00* (2006.01)
  *G06Q 20/32* (2012.01)
  *H04W 12/08* (2009.01)
  *H04W 4/00* (2009.01)
  *H04W 8/00* (2009.01)

(52) U.S. Cl.
  CPC .......... *H04L 63/10* (2013.01); *H04L 63/1408* (2013.01); *H04L 63/1416* (2013.01); *H04L 63/1475* (2013.01); *H04W 12/02* (2013.01); *H04W 12/08* (2013.01); *H04W 12/12* (2013.01); *H04W 4/008* (2013.01); *H04W 8/005* (2013.01)

(58) Field of Classification Search
  CPC ...... H04L 63/10; H04W 12/08; H04W 12/02; H04W 12/12; H04W 4/008; H04W 8/005; H04K 3/822
  See application file for complete search history.

(56) References Cited

U.S. PATENT DOCUMENTS

| | | | |
|---|---|---|---|
| 8,104,679 B2 | 1/2012 | Brown | |
| 8,386,381 B1 | 2/2013 | Barton et al. | |
| 8,458,069 B2 | 6/2013 | Adjaoute | |
| 8,479,267 B2 | 7/2013 | Donley et al. | |
| 8,523,072 B2 | 9/2013 | Randolph | |
| 8,695,879 B1 | 4/2014 | Whytock | |
| 9,525,689 B2* | 12/2016 | Batta | H04L 63/10 |
| 2004/0235453 A1 | 11/2004 | Chen et al. | |
| 2005/0060434 A1 | 3/2005 | Fazal et al. | |
| 2005/0104731 A1* | 5/2005 | Park | H04K 3/822 340/572.1 |
| 2006/0002331 A1* | 1/2006 | Bhagwat | H04L 12/2602 370/328 |
| 2006/0128311 A1 | 6/2006 | Tesfai | |
| 2007/0063838 A1* | 3/2007 | Yuzik | G07F 19/20 340/540 |
| 2007/0271457 A1 | 11/2007 | Patil et al. | |
| 2007/0298720 A1 | 12/2007 | Wolman et al. | |
| 2008/0172746 A1 | 7/2008 | Lotter | |
| 2008/0178294 A1 | 7/2008 | Hu et al. | |
| 2008/0291013 A1* | 11/2008 | McCown | G06F 21/552 340/539.13 |
| 2010/0065632 A1 | 3/2010 | Babcock et al. | |
| 2010/0112954 A1 | 5/2010 | Son | |
| 2010/0256823 A1 | 10/2010 | Cherukuri et al. | |
| 2010/0265121 A1 | 10/2010 | Bandhauer et al. | |
| 2010/0287083 A1* | 11/2010 | Blythe | G06Q 30/06 705/35 |
| 2010/0306105 A1 | 12/2010 | Walker et al. | |
| 2011/0191827 A1 | 8/2011 | Balay | |
| 2012/0094625 A1 | 4/2012 | Worley et al. | |
| 2012/0163206 A1 | 6/2012 | Leung et al. | |
| 2013/0007848 A1 | 1/2013 | Chaskar et al. | |
| 2013/0161388 A1 | 6/2013 | Mitchell | |
| 2013/0254117 A1 | 9/2013 | Von Mueller et al. | |
| 2014/0058854 A1 | 2/2014 | Ranganath et al. | |
| 2014/0162598 A1* | 6/2014 | Villa-Real | H04M 1/66 455/411 |
| 2014/0279503 A1 | 9/2014 | Bertanzetti et al. | |
| 2014/0372305 A1* | 12/2014 | Ray | G07F 19/2055 705/44 |
| 2015/0082429 A1 | 3/2015 | Rangarajan et al. | |
| 2015/0213427 A1 | 7/2015 | Hodges et al. | |
| 2015/0242662 A1* | 8/2015 | Claessen | G06K 7/10267 340/658 |
| 2015/0281236 A1 | 10/2015 | Batta et al. | |
| 2015/0371038 A1 | 12/2015 | Batta et al. | |

OTHER PUBLICATIONS

Ogundele et al., "The Implementation of a full EMV Smartcard for a Point-of-Sale Transaction", 2012, IEEE, pp. 28-35.*

Irina Sakharova, "Payment Card Fraud: Challenges and Solutions", Jun. 11-14, 2012, IEEE, pp. 227-234.*

International Search Report and Written Opinion for corresponding International Patent Application No. PCT/US2015/019629 dated Jun. 18, 2015.

* cited by examiner

DETECTION OF AN UNAUTHORIZED WIRELESS COMMUNICATION DEVICE

BACKGROUND

A recently growing problem in retail store environments has been the introduction of credit-card skimming devices installed in point-of-sale terminals. These skimming devices can be installed illicitly by criminals to capture the credit card information of customers as they swipe their credit card to make a payment to the store. This credit card information can be transmitted directly to the criminal via, for instance a Short Message Service (SMS) message or a General Packet Radio Service, 3$^{rd}$ Generation, Long Term Evolution (GPRS/3G/LTE) data connection, or more typically stored on flash memory in the skimmer device itself, to be retrieved later via a short-range wireless connection such as Bluetooth®. Illegal skimmers using Bluetooth® have been particularly popular with criminals recently because of the low power requirements, and easy availability of chips and control software.

Presently, store administrators address this problem by walking around the store with a handheld communication device or cellphone, which is Bluetooth® capable, looking (i.e. sniffing) for signals from these illegal skimming devices. This process is time consuming, error prone, expensive, and leaves large periods of time where an unauthorized skimming device can stay active in the store. Moreover, Bluetooth "sniffing" and wireless intrusion protection systems (WIPS) are a new network role that is poorly defined at this time.

Accordingly, there is a need for a technique by which the above described illegal skimmers can be detected and flagged for a system administrator's attention.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
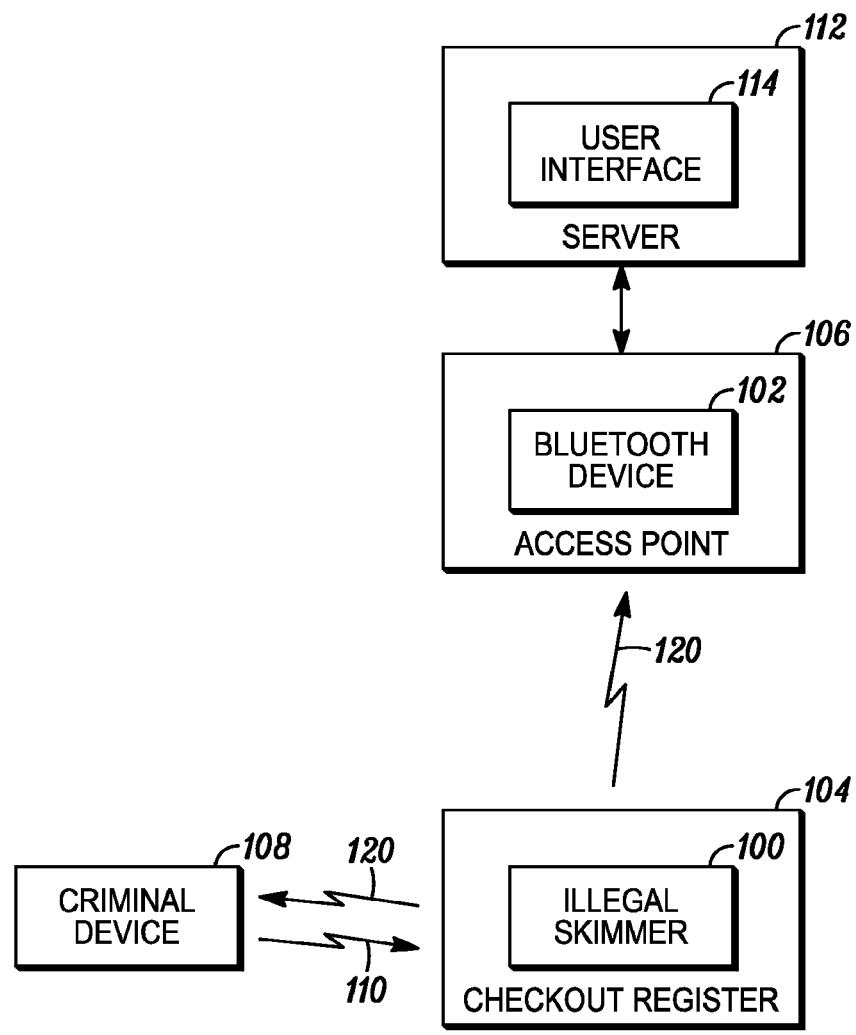
FIG. 1 is a simplified block diagram of a system, in accordance with some embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a technique by which illicit skimmers can be detected and flagged for a system administrator. In particular, the present invention monitors, by a Bluetooth® communication device, communications activity on one or more Bluetooth® communication channels; analyzes, by either the Bluetooth® communication device directly or a central server provided with reports of the monitored communication activity, for detection of illicit communication from an illegal skimmer; and triggering, in response to detection of the illegal skimmer, an alert to a system administrator.

FIG. 1 is a block diagram depiction of a system that can use various wireless communication technologies, in accordance with the present invention. The wireless systems can include local and wide-area networks, or other IEEE 802.11 wireless communication system. However, it should be recognized that the present invention is also applicable to many various wireless communication systems. For example, the description that follows can apply to one or more communication networks that are IEEE 802.xx-based, employing wireless technologies such as RF, IrDA (infrared), Bluetooth®, ZigBee (and other variants of the IEEE 802.15 protocol), IEEE 802.11 (any variation), IEEE 802.16 (WiMAX or any other variation), IEEE 802.11u (Wi-Fi® certified Passpoint®), IEEE 802.20, Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB, any of which can be modified to implement the embodiments of the present invention. In an exemplary embodiment, the devices and access point herein are preferably compliant with at least the Bluetooth® and IEEE 802.11 specifications.

FIG. 1 shows various entities adapted to support the inventive concepts of the preferred embodiments of the present invention. Those skilled in the art will recognize that FIG. 1 does not depict all of the equipment necessary for system to operate but only those system components and logical entities particularly relevant to the description of embodiments herein. For example, optical systems, tracking devices, servers, and wireless access points can all includes processors, communication interfaces, memories, etc. In general, components such as processors, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the correlation and association aspects of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

FIG. 1 is a block diagram of a system for the detection of an unauthorized wireless communication device 100. As illustrated, the system includes at least one Bluetooth® communication capable device (such as 102 as illustrated connected to an wireless local area network (WLAN such as Wi-Fi®) access point 106 for example) for detecting or sniffing communication activity from the unauthorized device 100. In one embodiment, the Bluetooth® device 102 can be incorporated within a USB module that can attach to an existing USB port of the access point 106. Each access point is a node in the WLAN that connects to a central backend controller or central server 112. The access points are typically fixed nodes of the WLAN that includes the infrastructure elements necessary to enable wireless communications, (i.e., antennas, radio frequency transceivers, and various integrated circuits). The server 112 or backend controller can include a user interface 114 to alert a system or store administrator if there is a suspicion that there is an illegal skimmer 100 in the store. In one embodiment it is envisioned that an illegal skimmer is a Bluetooth® communication capable device that is connected illicitly to a point-of-sale terminal 104, such as a checkout register or an automatic teller machine, and can provide illegally obtained credit card information 120 that has been skimmed from the point-of-sale terminal 104 to a criminal device 108, either continuously or by means of a download trigger 110 from the criminal device 108.

In practice, the present invention could have a Wi-Fi® access point connected with a Bluetooth® chip, either built into its base board, or connected by a USB module that is plugged into an access point having USB ports available for extended functionality. The access point can keep its Bluetooth® device 102 in a continuous polling mode, for scanning and monitoring for Bluetooth® communications 120 from devices such as the illegal skimmer 100. Of course, there may be legitimate Bluetooth® devices in the store also. Therefore, the present invention provides monitoring functionality to help distinguish between legitimate and illicit Bluetooth® communications 120. Monitoring can be based on a distributed collaborative monitoring architecture that intelligently scans Bluetooth® frequencies over time and space to detect illegal devices 100.

Any Bluetooth® communication that is discovered and monitored in the store is then heuristically analyzed by a processor in one or more of the Bluetooth® device 102, access point 106, or server 112 to help determine whether the device sending that Bluetooth® communication is an illegal device and whether an alert is to be raised to a system administrator, such as on the user interface 114 of the central server 112. Analyzing applies various heuristics to determine the probability of whether the device sending that Bluetooth® communication is an illegal skimming device and whether the system administrator should be alerted. Once an illegal device 100 is suspected through analyzing, information about that device (signal strength, time of discovery, location, Media Access Control address, type, vendor, etc.) can be collected or determined and provided in the alert also. Analyzing can consider several different analysis parameters that are predefined or preconfigured by the store administrator to determine whether to generate an alert. These parameters can be used separately or in conjunction with other parameters using a heuristic analysis approach to flag whether an activity may be from a suspected illegal skimmer device.

One analysis parameter is whether the device is discoverable. In particular, the monitoring Bluetooth® device 102 detects other Bluetooth® devices (i.e. 100) that are in discoverable mode. This could indicate an illegal device inasmuch as many of the skimmers that are sold by the people who develop them are set in discoverable mode by default, and the users who actually end up using these devices to skim credit card data typically do not care about the configuration of the device as long as they follow the simple steps to install them on a compromised point-of-sale terminal. Therefore, these illegal devices generally can show up in discoverable mode (the default configuration) whereas legitimate devices are typically found in paired-mode with other devices in the store. This parameter is not used as a definitive test for illegal devices since some legitimate devices can also be found in discoverable mode. However, this test provides a benefit in that discoverable devices can be scanned and detected much quicker than non-discoverable devices. An alert could be generated for any discoverable devices found, depending on system administrator preferences.

Another analysis parameter is whether the device is in a non-discoverable mode. Most typical legitimate devices are in paired mode or possibly discoverable modes, whereas finding a device in non-discoverable mode raises a red flag. If a device is not in discoverable mode, the only way to 'talk' to it is to know its Media Access Control (MAC) address. Since a store administrator will not know device MAC addresses in advance, the administrator would have to guess the MAC address. The complete MAC address field is quite large (six bytes) but it has three bytes of vendor info for which the administrator can use a known subset and then cycle through all the values of the bottom three bytes to find any non-discoverable devices. In this way, the present invention "brute-forces" the MAC address of the sniffer device 102 to be able to talk to and discover an illegal skimmer that is otherwise hidden from the system administrator. For any non-discoverable devices that are found, an alert could be generated.

Another analysis parameter is the type of data within a monitored Bluetooth® communication. If data from the communications activity is recognized as including a series of sixteen-digit credit card numbers with associated expiration dates, this is a strong indicator that the system administrator should be alerted. In addition, information that relates to credit card transaction logging information such as a series of dates, time-stamps, and the like, are also strong red flags for sending an alert. In addition, Bluetooth® devices can advertise their class of operation (audio/networking/phone/imaging miscellaneous, etc.) and for devices such as illegal skimmers these fields usually will be set to a default (i.e. miscellaneous) which can again be a trigger to flag a potentially suspect device, for sending an alert.

Another analysis parameter is Bluetooth® communication activity that coincides with updates from a point-of-sale terminal. For example, each time there is a person using the point-of-sale terminal, if a corresponding Bluetooth® data transfer is noted at the same time, this is a suspected transaction that is a red flag for sending an alert.

Another analysis parameter is how long a Bluetooth® communication session is conducted. If the continuous communication time exceeds a predetermined time limit than an alert could be generated. For example, if a device communication is monitored in a Bluetooth® session for a short period, that device could be a phone, headset or other Bluetooth device being used by a store customer. However, if the monitored communications activity is longer compared to normal communications activity, then an alert could be generated. For example, if communication activity is seen in the store, say for six hours continuously, then it is likely that the communication is illicit and the system administrator should be alerted. In another example, if an exceedingly long data connection between two devices in the exact same location (and therefore not someone moving around), with continuous short bursts of information (unlike a video or audio stream) going on for say an hour would be a suspected event. Although such communication could still be legitimate, the administrator can be alerted to investigate.

Another analysis parameter is time of day. If a Bluetooth® communication is monitored in the store while the store is closed, then it is likely that the system administrator should be alerted.

Another analysis parameter is when the communication is first monitored. If the first time that a particular Bluetooth® communication occurs is outside of regular store hours, then it is likely that the system administrator should be alerted.

Some of the above parameters are stronger than others for indicating the presence of an illegal skimming device. Therefore, the store administrator can employ a heuristic analysis approach to set preferences for triggers for those parameters, or those combinations of parameters, that will trigger an alert indication. These preferences could be set manually or determined automatically in a dynamic fashion using empirical data. Moreover, parameters can be given different weightings for consideration in generating an alert. For example, finding a device in non-discoverable mode could be given a higher weighting than finding a device in discoverable mode.

In accordance with some embodiments, the WLAN system includes access points 106 with special firmware allowing radio frequency (RF) capture of Bluetooth® communications from its coupled Bluetooth® device 102, which can be operated as dedicated Bluetooth® sensor or discrete sniffer that captures and analyzes frames over the Bluetooth® air interface. The access point and associated Bluetooth® device 102 can listen to all transmitted Bluetooth® packets 120 using an intelligent channel scanning algorithm to detect traffic across the operational Bluetooth® spectrum. The access point and Bluetooth® device 102 can locally analyze all the received packets, collect several statistics and events of interest, and communicate selected events and statistics over a link to the central server 112 within the WLAN system. Alternatively, the access point and Bluetooth® device 102 can supply raw traffic data to the server for analysis. The access point 106 and server 112 can be connected using a wired or wireless network connection. For example, the network interface could be wired (e.g. Ethernet, Cable, Digital Subscriber Line (DSL), and the like) or wireless (Wi-Fi, WiMAX, Cellular, and the like), allowing communication with the server or other devices.

The system architecture is such that analysis functionality can be adaptively shifted between the access point 106 and server 112. The server 112 can ask the access point 106 to process more events and statistics and provide a consolidated analysis periodically. The server 112 can also ask the access point 106 to provide a real-time feed of all packets the Bluetooth® device 102 is monitoring at any given time. The server 112 also provides a centralized repository to store observed events and statistics.

The access point 106 includes a radio, a processor, memory (volatile and non-volatile), a network interface to communicate with the server and/or other devices, and an optional Global Positioning System (GPS) receiver allowing it determine its physical location if its location is not already predetermined. Alternatively, if the access point is fixed the access points and/or the server can be programmed with their location data. Therefore, given access point location data and either signal strength or time of arrival data, a location of the illegal device 100 can be determined using techniques known in the art, and can be provided in the alert to the store administrator.

Figure 2:
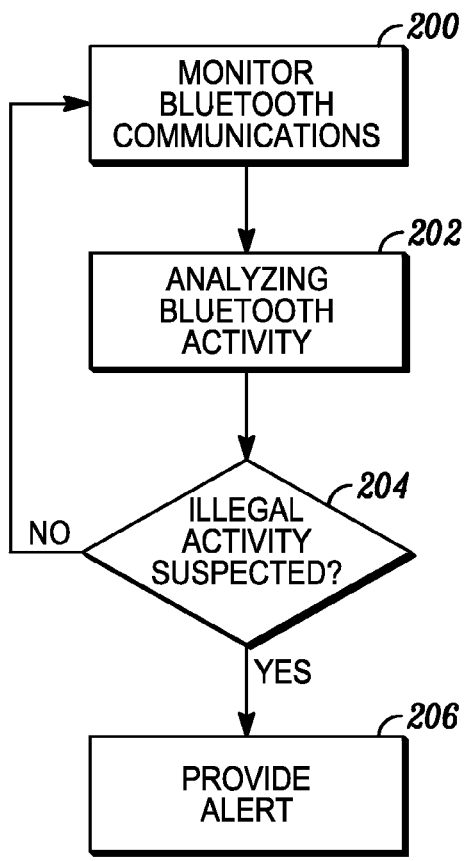
FIG. 2 illustrates a flow chart of a method, in accordance with some embodiments of the present invention.

FIG. 2 is a flowchart illustrating a method for the detection of an unauthorized wireless communication device.

As illustrated, the method begins with monitoring 200 of Bluetooth® communications activity with a Bluetooth® capable communication device over the Bluetooth® spectrum.

A next step includes analyzing 202 any monitored Bluetooth® communication activity against parameters that are predefined to detect suspected illegal communication activity. The particular parameters used have been described previously. Heuristic analyzing can be done within the communication device, access point, or can be supplied to a central server. If supplied to a central server, the server can aggregate activity data from various communication devices, maintain a centralized forensic record of events and statistics, and run various tests to detect criminal activity, policy violations, known attacks, protocol violations, and anomalous behavior.

If illegal activity is suspected 204 by the heuristic analysis, the operation continues to the next step where an alert is generated 206 for a system or store administrator. The alert could be in the form of an audio, textual or visual alarm on a server user interface, messages such as email or short messaging service (SMS), or a page, events sent to incident management systems, and the like. The system can also automatically respond if certain conditions are detected. For example, if illegal activity is suspected, the alert can automatically trigger a location tracking operation to determine the physical co-ordinates of the illegal skimmer and dispatch appropriate personnel. In particular, the Bluetooth® sniffer communication devices can estimate the relative distance of the illegal skimmer based on the received signal strength and estimated propagation path loss. Using the known co-ordinate locations of multiple Bluetooth® devices or associated access points, the co-ordinates of the illegal skimmer can be calculated. In one embodiment, the location of the illegal skimmer may be computed using this technique and the computed location may then be compared with the list of known point-of-sale terminal locations. If there is a match then the located point-of-sale terminal would be flagged to be inspected to find the illegal skimmer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for the detection of an unauthorized wireless skimming device comprising:
   a communications monitor operable to monitor short-range wireless communications activity;
   a processor communicatively coupled with the communication monitor and operable to analyze monitored short-range wireless communications activity against parameters that are predefined to detect suspected illegal activity by the skimming device; and
   a user interface communicatively coupled with the processor and operable to generate an alert for a system administrator when illegal activity by the skimming device is suspected by the processor, wherein one of the predefined parameters associates illegal activity with payment card data within the monitored short-range wireless communications activity, the payment card data including at least one of credit card numbers and credit card expiration dates.

2. The apparatus of claim 1, wherein the communications monitor is operable to monitor Bluetooth® communications activity.

3. The apparatus of claim 2, wherein another one of the predefined parameters associates illegal activity with detecting a Bluetooth® discoverable communication device.

4. The apparatus of claim 2, wherein another one of the predefined parameters associates illegal activity with detecting a Bluetooth® non-discoverable communication device by cycling through a set of Media Access Control addresses to find any non-discoverable devices.

5. The apparatus of claim 1, wherein the one of the predefined parameters includes a series of dates and timestamps.

6. The apparatus of claim 1, wherein another one of the predefined parameters includes a class of operation field set to miscellaneous.

7. The apparatus of claim 1, wherein another one of the predefined parameters associates illegal activity with a determination that the timing of monitored wireless communications activity coincides with updates from a point-of-sale terminal.

8. The apparatus of claim 1, wherein another one of the predefined parameters associates illegal activity with monitoring of wireless communications activity after a store has closed.

9. The apparatus of claim 1, wherein another one of the predefined parameters associates illegal activity with a starting of wireless communications activity after a store has closed.

10. The apparatus of claim 1, wherein another one of the predefined parameters associates illegal activity with wireless communications activity that is longer compared to normal communications activity.

11. The apparatus of claim 1, wherein another one of the predefined parameters associates illegal activity with wireless communications activity of devices that are not moving.

12. A network access point comprising:
    a communications monitor operable to monitor short-range wireless communications activity;

a processor communicatively coupled with the communications monitor and operable to analyze monitored short-range wireless communications activity against parameters that are predefined to indicate suspected illegal activity by a skimming device;

wherein the processor is operable to generate an alert when illegal activity by the skimming device is suspected based at least in part on one of the predefined parameters associating the suspected illegal activity by the skimming device with payment card data within the monitored short-range wireless communications activity, the payment card data including at least one of credit card numbers and credit card expiration dates.

13. The network access point of claim 12, wherein the one of the predefined parameters includes a series of dates and time-stamps.

14. The network access point of claim 12, wherein another one of the predefined parameters includes a class of operation field set to miscellaneous.

15. The network access point of claim 12, wherein another one of the predefined parameters associates illegal activity with a determination that the timing of monitored wireless communications activity coincides with updates from a point-of-sale terminal.

16. A method for the detection of an unauthorized wireless communication device, comprising:

monitoring short-range communications activity;

analyzing monitored communications activity against parameters that are predefined to indicate suspected illegal activity by the unauthorized wireless communication device; and generating an alert when illegal activity by the unauthorized wireless communication device is suspected based at least in part on detecting payment card data within the monitored short-range wireless communications activity, the payment card data including at least one of credit card numbers and credit card expiration dates.

17. The method of claim 16, wherein the parameters include a series of dates and time-stamps.

* * * * *